US006826947B2

United States Patent
Solet et al.

(10) Patent No.: US 6,826,947 B2
(45) Date of Patent: Dec. 7, 2004

(54) CALIBRATION PROCESS FOR THE MOBILE SPRING OF A SOLENOID VALVE

(75) Inventors: Daniel Solet, Saint Sauveur Levasville (FR); Bernard Courpron, Nogent le Roi (FR); Richard Vandamme, Mainvilliers (FR)

(73) Assignee: ASCO Joucomatic (FR)

( * ) Notice: Subject to any disclaimer, the term of this patent is extended or adjusted under 35 U.S.C. 154(b) by 0 days.

(21) Appl. No.: 10/338,473

(22) Filed: Jan. 9, 2003

(65) Prior Publication Data

US 2003/0131651 A1 Jul. 17, 2003

(30) Foreign Application Priority Data

Jan. 16, 2002 (FR) .............................. 02 00505

(51) Int. Cl.[7] .............................................. G01L 27/00
(52) U.S. Cl. ........................................ 73/1.72; 73/1.36
(58) Field of Search ............................... 73/1.71, 1.72, 73/1.36

(56) References Cited

U.S. PATENT DOCUMENTS

| 3,462,994 | A | * | 8/1969 | Maust | 137/557 |
| 3,862,820 | A | * | 1/1975 | Hantack | 431/66 |
| 5,179,888 | A | * | 1/1993 | Schendel et al. | 91/387 |
| 5,197,507 | A | * | 3/1993 | Miki et al. | 137/1 |
| 5,878,647 | A | * | 3/1999 | Wilke et al. | 91/445 |
| 6,062,075 | A | * | 5/2000 | Ritz et al. | 73/168 |
| 6,260,404 | B1 | * | 7/2001 | Aota et al. | 73/1.36 |
| 6,298,731 | B1 | * | 10/2001 | Wade et al. | 73/756 |
| 6,382,926 | B2 | * | 5/2002 | Ota et al. | 417/222.2 |
| 6,397,655 | B1 | * | 6/2002 | Stephenson | 73/1.72 |
| 2003/0209615 | A1 | * | 11/2003 | Ishii et al. | 239/585.1 |

* cited by examiner

Primary Examiner—Charles D. Garber
(74) Attorney, Agent, or Firm—Connolly Bove Lodge & Hutz LLP

(57) ABSTRACT

Process for calibration of the mobile core spring of a solenoid valve comprising an electromagnet subassembly associated with a pneumatic switching subassembly with a valve plug, the valve plug being moved in the body of the pneumatic switching subassembly firstly by a spring located in the mobile core of the electromagnet subassembly through a pusher, and secondly by a spring located under the valve plug and bearing around the lower seating of the pneumatic switching subassembly, this process comprising the following steps:

a force sensor is put into position, either at a predetermined distance from the upper face of the mobile core, this distance being equivalent to the actual travel distance of the mobile core, or directly in contact with the face of the core when it is required to adjust the spring based on its force after the travel distance (core in contact on the yoke);

the spring is installed in a reaming providing for this purpose in the axis of the mobile core:

an elastic split pin is put into position behind the said spring, that is forced more or less into the reaming of the mobile core while measuring the force generated by the spring on the sensor, and the split pin is no longer forced into the core as soon as the required force is measured by the sensor.

5 Claims, 4 Drawing Sheets

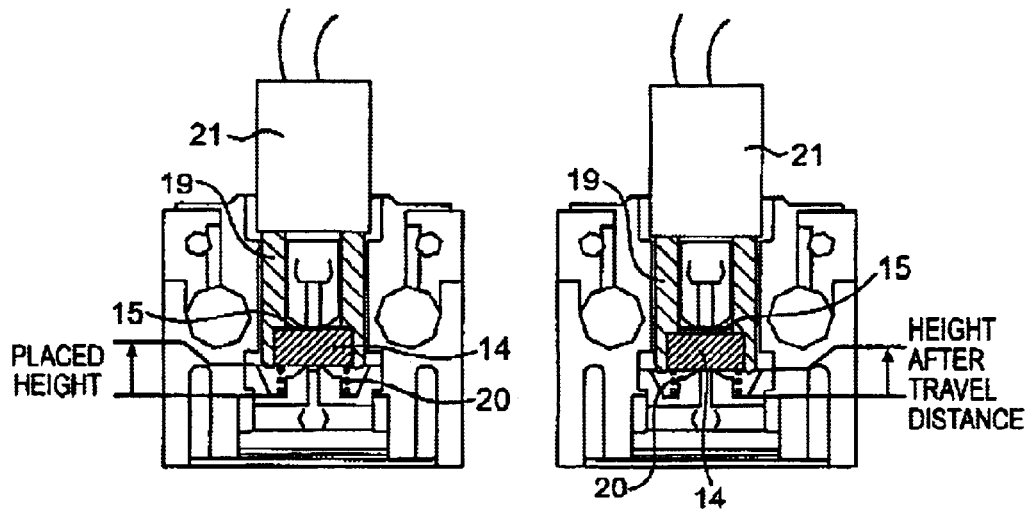
FIG. 5a   FIG. 5b
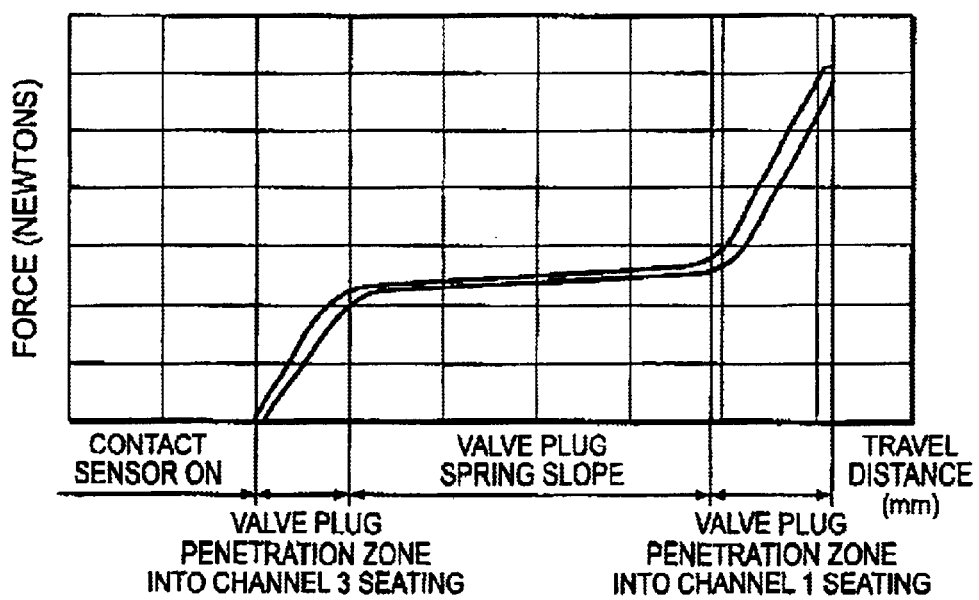
FIG. 6

CALIBRATION PROCESS FOR THE MOBILE SPRING OF A SOLENOID VALVE

FIELD OF THE INVENTION

The present invention in general relates to improvements made to solenoid valves. It is more particularly applicable to solenoid valves comprising an electromagnet subassembly associated with a pneumatic switching subassembly with a valve plug, the pneumatic switching subassembly being composed of a body enclosing the valve plug trapped between two sealing seatings facing each other. The valve plug movement is provoked firstly by a spring located in the mobile core of the electromagnet subassembly by means of a pusher, and secondly by means of a spring located under the valve plug (usually called valve plug underspring) and bearing around the lower seating of the pneumatic switching subassembly, this valve plug underspring forcing the said valve plug into contact with the upper seating of the pneumatic switching subassembly when the solenoid valve is energized. In the rest position, in other words when the solenoid valve is not energised, the spring of the mobile core of the electromagnet subassembly pushes the core into contact on the pusher and forces the valve plug onto the seating of the lower channel of the solenoid valve.

BACKGROUND OF THE INVENTION

The improvements according to the invention will be better understood with reference to FIGS. 1 and 2, which show axial and vertical sections through an electromagnet according to prior art.

These FIGS. 1 and 2 show that this invention relates to a solenoid valve comprising firstly an electromagnet subassembly denoted as a whole as reference 10, and secondly a pneumatic switching subassembly denoted as a whole as reference 12. Mechanical means are used to assemble these two subassemblies 10 and 12.

The pneumatic switching subassembly 12 is composed of a body enclosing a valve plug 14, preferably made from an elastomer, that is trapped between two sealing seatings 15 and 16 facing each other. The movement of the valve plug 14 in the body of the pneumatic switching subassembly 12 is caused firstly by a spring 17 positioned in the mobile core 18 of the electromagnet subassembly 10 by means of a pusher 19, and secondly by a spring 20 (valve plug underspring) to return the valve plug.

In the rest position, in other words when the electromagnet is not energised, the spring 17 pushes the mobile core 18 such that it forces the valve plug 14 through its pusher 19 onto the seating 16 of the lower channel of the solenoid valve.

The force applied by the spring 17 of the mobile core 18 must be sufficient to guarantee leak tightness of the lower seating 16, and to achieve this result, this force must be equal to the following sum:

(pressure×cross section of seating 16)+force of spring 20+additional sealing force.

In this respect, refer to FIG. 3 which shows the force of the spring 17 as a function of the air gap of the lower seating 16 of the valve plug.

When the solenoid valve is ni the open position, in other words when the electromagnet is energised, the magnetic force that it generates in the mobile core 18 is greater than the force of the spring 17 under these conditions, the mobile core 18 forces it into contact with the fixed core 21a (or the yoke) of the electromagnet subassembly 10 and it no longer applies any force on the valve plug 34 through the pusher 19. The return spring 20 of the valve plug 14 then forces the valve plug into contact with the upper seating 15 of the subassembly 12.

Considering its manufacturing mode (particularly the steel quality, wire diameter, number and pitch of the turns, free length), the spring 17 of the mobile core can only be made with a certain tolerance on the free length, and therefore on the force at a certain predetermined height called the "placed height". In solutions used at the moment, the force can vary from 20 to 40% for a load at a placed height, which is becoming less acceptable in the current attempt to improve the performances and miniaturization of this type of solenoid valve.

The most frequently used solution to solve this problem at the moment is to sort the springs in order to reduce the manufacturing tolerance. This technique is a simple means of reducing manufacturing dispersions, but it still leaves relatively large variations and it increases the cost of the spring production due to manufacturing scrap.

Another solution used at the moment is to adjust the mobile core spring after the solenoid valve has been assembled. Consequently, the yoke, in other words the fixed core of the electromagnet subassembly, is perforated and drilled in the axial direction so that a threaded pusher can be fitted into it on which an O-ring is fitted to make it leak tight. This threaded pusher is in contact at one of its ends with the spring of the mobile core of the electromagnet subassembly. In order to adjust the solenoid valve, in other words the spring force on the mobile core, all that is necessary is to apply the maximum usage pressure in the lower channel of the solenoid valve and then screw the pusher in until the spring of the mobile core seals the lower seating under the pressure. This known solution is precise because the mobile core spring only applies the force necessary to create a seal on the lower seating of the valve plug of the solenoid valve. The disadvantage of this solution is its manufacturing and installation costs: it requires tapping to be formed in the fixed yoke of the solenoid valve, machining of an additional part (threaded pusher) and the installation of an additional O-ring to seal the assembly.

BRIEF DESCRIPTION OF THE INVENTION

Starting from this state of the art, the present invention has the objective of solving the technical problem mentioned above, in other words:

to reduce dispersions in the force in the spring in the mobile core of the electromagnet assembly, and also to compensate for dispersions in the valve plug return spring (valve plug underspring) of the pneumatic switching subassembly, in a simple manner without it being necessary to use additional sealing means.

Consequently, this invention relates to a process for calibration of the mobile core spring of a solenoid valve comprising an electromagnet subassembly associated with a pneumatic switching subassembly with a valve plug, the valve plug being moved in the body of the pneumatic switching subassembly firstly by a spring located in the mobile core of the electromagnet subassembly through a pusher, and secondly by a spring located under the valve plug and bearing on the lower seating of the pneumatic switching subassembly, this process being characterised in that:

a force sensor is put into position, either at a predetermined distance from the upper face of the core, this distance being equivalent to the actual travel distance of the mobile core, or directly in contact with the face of the core when it is required to adjust the spring based on its force after the travel distance (core in contact on the yoke);

the spring is installed in a reaming provided for this purpose in the axis of the mobile core, and then, an elastic pin is put into position behind the said spring, that is forced more or less into the reaming of the core while measuring the force generated by the spring on the sensor, and the pin is no longer forced into the core as soon as the required force is measured by the sensor.

According to one embodiment of the process according to the invention, the parameters used for adjustment of the spring are firstly:

the placed spring height, in other words the height at which the spring must supply the force necessary to seal the lower seating, and secondly, the force necessary to seal the lower seating, these two parameters being either calculated or measured.

According to another embodiment of the invention, the said pin is perforated on each side. It may preferably be made by spiral winding of a metallic wire, or it may be in the form of a cylindrical part or a ball.

The process according to the invention may be applied to a normally open type solenoid valve. According to this particular application, the spring of the mobile core of the electromagnet subassembly is adjusted by using the sensor to measure the force generated by the valve plug underspring when it is assembled in the pneumatic switching subassembly and this force is reproduced in the mobile core spring so that the tolerances of the two springs are compensated by the setting of the mobile core spring.

Other advantages and specificities of this invention will become clear from the following description, with reference to the appended drawings, which illustrate example embodiments, that are in no way restrictive, wherein:

BRIEF DESCRIPTION OF THE FIGURES

FIGS. 5a and 5b show another example embodiment of the invention and,

FIG. 6 illustrates spring force curves for the valve plug underspring, as a function of the travel distance of the valve plug for a normally open solenoid valve.

DETAILED DESCRIPTION OF THE INVENTION

As mentioned above, the process according to the invention is designed to compensate for manufacturing dispersions of the spring 17 of the mobile core 18 of the electromagnet subassembly of the solenoid valve by means of a simple adjustment that does not require any additional sealing means, this adjustment being made at the centre of the mobile core 18.

Figure 2:
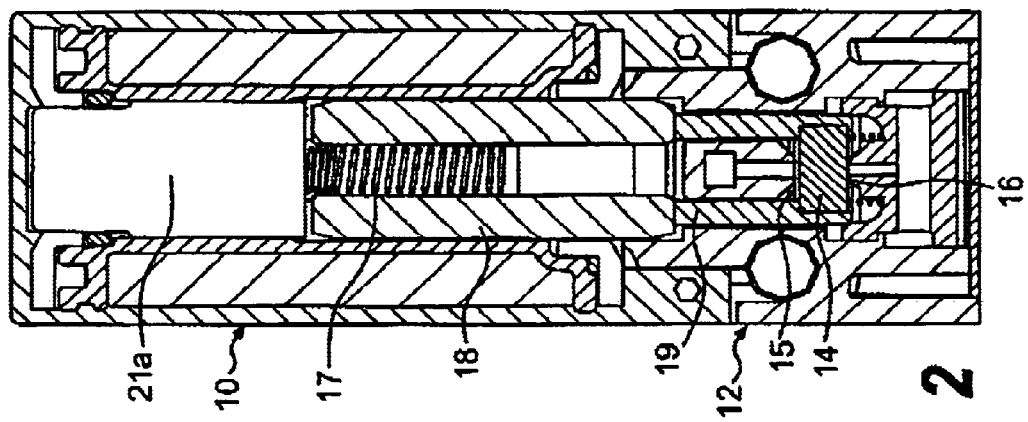
FIGS. 1 and 2 are axial and vertical sectional views of a solenoid valve to which the process according to the invention is applicable, and which were referred to in the preamble to this description.
Figure 1:
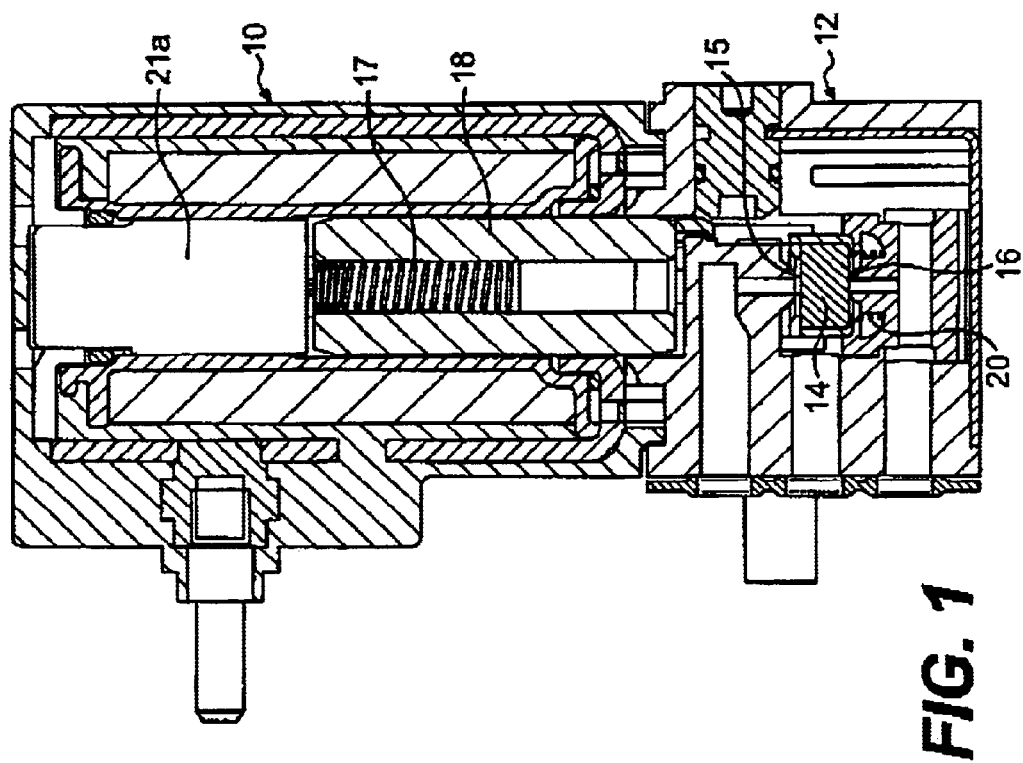
Figure 3:
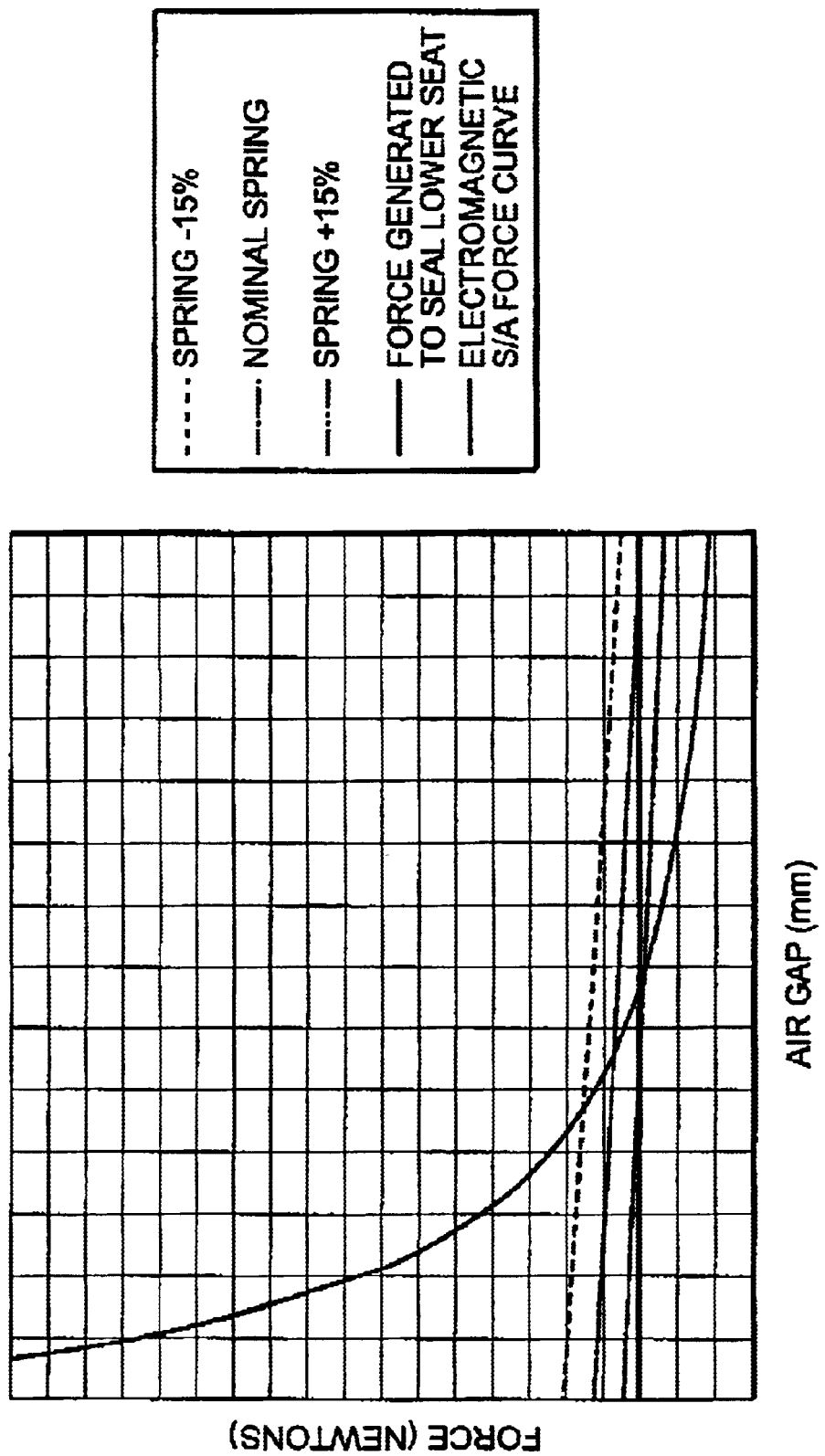
FIG. 3 shows curves that illustrate the force of the mobile core spring (under specific conditions indicated on the table attached to this figure) as a function of the air gap of the lower seating of the solenoid valve plug.
Figure 4:
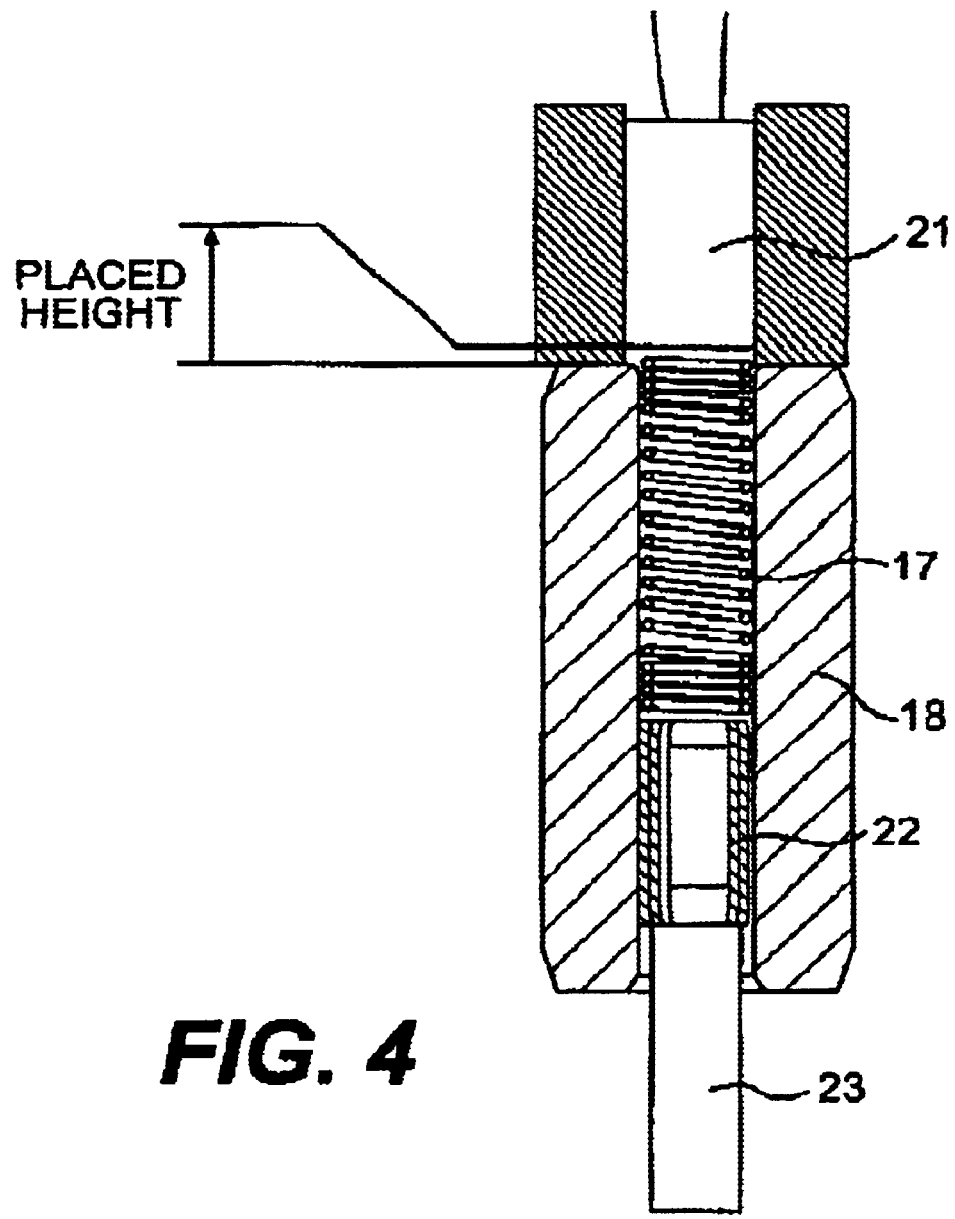
FIG. 4 is a diagrammatic view illustrating the embodiment of the process according to the invention.

Refer to FIG. 4. It can be seen that the mobile core 18 is crossed by a reaming that is sized such that the spring 17 can fit into it. In this example embodiment according to the invention, the force sensor 21 is positioned at a predetermined distance equivalent to the real travel distance of the mobile core 18 of the upper face of the core 18. When the spring must be adjusted on its force after the travel distance (core in contact on the yoke), the sensor 21 must be positioned directly in contact on the face of the core. The spring 17 being positioned in the reaming of the core 18, an elastic pin 22 is inserted behind the spring 17 bearing on the spring, as can clearly be seen in FIG. 4. This elastic pin may for example be made by winding a metallic wire in spiral form. It may be made in other forms, for example as an elastic cylindrical part, or a ball, etc.

According to this invention, the adjustment of the spring 17 is obtained by means of split pin 22, by penetrating this split pin more or less into the reaming of the core 18. A pusher like 23 can be used for this purpose, and the force generated by the spring 17 on the sensor 21 when the pusher pushes the split pin, is measured. As soon as the sensor 21 has measured the required force, the pin 22 is no longer pushed into the reaming in the core.

The parameters, that are taken into account for the adjustment of the spring 17 under the conditions described above are as follows:

the placed spring height, in other words the height at which the spring 17 must supply the force necessary to seal the seating 16 on the lower channel of the solenoid valve; this placed height is shown in FIG. 4, and the force necessary to seal the lower seating 16.

These two parameters may either be calculated or measured, and as soon as they are known, the adjustment process according to the invention described above can be implemented.

The process according to the invention is a means of reducing the tolerance of the force of the mobile core spring 17 to a value of less than 10%. The characteristic consisting of using an elastic split pin like 22 to make the adjustment has the following specific advantages:

it is a part that is easy to make in large production series and is therefore inexpensive, and it is much more economic in practice than paying the extra cost necessary to sort springs using one of the solutions according to prior art in the description given above;

it is possible to make an axial reaming in the mobile core 18 with a manufacturing tolerance similar to what could be obtained with a bit, while a much fighter tolerance is necessary for tight fitting of machined parts such as the threaded pusher used in the other solution according to prior art mentioned above;

since the split pin 22 drilling passes from side to side, the "dashpot" effect, in other words air compression in the reaming of the mobile core 18 into which the spring 17 fits when it comes into contact with the fixed core 21a during operation of the solenoid value, is eliminated.

Other example embodiments of the process according to the invention are illustrated in FIGS. 5a and 5b.

These examples refer to a 3/2 type solenoid valve, normally closed, but that may be supplied in a normally open version, the pressure supply and exhaust then being reversed, while the working channel remains the same. The invention may also be applied to "universal" solenoid valves in which the pressure may be applied through any channel.

Under these applications, it is also necessary to achieve an equilibrium of forces between springs 17 and 20:

force in spring 17 of mobile core 18>force in the valve plug underspring 20.

However, the valve plug underspring 20 must be sufficient to create a sealing pressure at the seating 15 of the upper channel of the solenoid valve. This is the same as the problem described above and solved by this invention, i.e. the problem of the tolerance of the spring 17 of the mobile core.

The solution is exactly the same as that described above; the spring 17 of the mobile core 18 is adjusted by measuring the force generated by the valve plug underspring 20 when it is assembled in a pneumatic switching subassembly and if this force is reproduced in the spring 17 of the mobile core such that the tolerances of the two springs are compensated by adjusting the spring 17 (FIGS. 5*a*, 5*b* and FIG. 6).

Obviously, this invention is not limited to the example embodiments described and represented above, but it includes all variants of it.

What is claimed is:

1. Process for calibration of the mobile core spring of a solenoid valve comprising an electromagnet subassembly associated with a pneumatic switching subassembly with a valve plug, the valve plug being moved in the body of the pneumatic switching subassembly firstly by a spring located in the mobile core of the electromagnet subassembly through a pusher, and secondly by a spring located under the valve plug and bearing around the lower seating of the pneumatic switching subassembly, this process comprising the following steps:

(a) a force sensor is put into position, either at a predetermined distance from the upper face of the mobile core, this distance being equivalent to the actual travel distance of the mobile core, or directly in contact with the face of the core when it is required to adjust the spring based on its force after the travel distance (core in contact on the yoke);

(b) the spring is installed in a reaming providing for this purpose in the axis of the mobile core;

(c) an elastic split pin is put into position behind the said spring, that is forced into the reaming of the mobile core while measuring the force generated by the spring on the sensor, and (d) the split pin is no longer forced into the core as soon as the required force is measured by the sensor.

2. Process according to claim 1, wherein the parameters used to adjust the spring are:

the placed spring height, i.e. the height at which the spring of the mobile core must supply the force necessary to seal the lower seating; and the force necessary to seal the lower seating, these two parameters being calculated or measured.

3. Process according to claim 1, wherein the drilling in said pin goes from side to side.

4. Process according to claim 3, wherein said pin is made by winding a metallic wire in spiral form.

5. Process according to claim 1, applied to a normally open type solenoid valve, wherein the spring of the mobile core is adjusted by using the sensor to measure the force generated by the valve plug underspring when it is assembled in the pneumatic switching subassembly and this force is reproduced in the spring of the mobile core so that the tolerances of the two springs are compensated by the setting of the spring.

* * * * *